United States Patent
Feldman et al.

(10) Patent No.: US 6,856,980 B2
(45) Date of Patent: Feb. 15, 2005

(54) HYBRID USE OF RULE AND CONSTRAINT ENGINES

(75) Inventors: Jacob Feldman, Edison, NJ (US); Alexander Korolov, Cliffside Park, NJ (US); Semen Meshcheryakov, Edison, NJ (US); Stanislav Shor, Edison, NJ (US)

(73) Assignee: Exigen Group, San Francisco, CA (US)

(*) Notice: Subject to any disclaimer, the term of this patent is extended or adjusted under 35 U.S.C. 154(b) by 464 days.

(21) Appl. No.: 09/952,821

(22) Filed: Sep. 13, 2001

(65) Prior Publication Data

US 2002/0198753 A1 Dec. 26, 2002

Related U.S. Application Data

(60) Provisional application No. 60/300,951, filed on Jun. 25, 2001.

(51) Int. Cl.$^7$ ............................................. G06F 17/00
(52) U.S. Cl. ......................................................... 706/47
(58) Field of Search .......................................... 706/47

(56) References Cited

U.S. PATENT DOCUMENTS

| | | | |
|---|---|---|---|
| 5,129,043 A | * 7/1992 | Yue | 706/60 |
| 5,276,776 A | * 1/1994 | Grady et al. | 706/48 |
| 5,970,490 A | 10/1999 | Morgenstern | |
| 6,289,382 B1 | 9/2001 | Bowman-Amuah | |
| 6,292,830 B1 | 9/2001 | Taylor et al. | |
| 6,332,163 B1 | 12/2001 | Bowman-Amuah | |
| 6,513,059 B1 | 1/2003 | Gupta | |

FOREIGN PATENT DOCUMENTS

WO  PCT US02/15324  3/2003

* cited by examiner

Primary Examiner—George Davis
(74) Attorney, Agent, or Firm—Blakely, Sokoloff, Taylor & Zafman LLP

(57) ABSTRACT

A method and apparatus that allow business users to dynamically add, modify, and delete business rules and associated constraints, and then to apply these changes in a very efficient manner without needing to recompile and/or restart e-business applications, is disclosed. According to one embodiment, hybrid use of the business rules and constraints with multiple decision-support engines provides the practical solution for the described problems. Rules are used to define the generic search space only, without needing to describe all special cases. Then an optimization (not rule-based) engine can automatically create and analyze all possible branches of the tree specified by the rules to select the best one. Because one universal rule engine is not sufficient to handle online decision support, in one embodiment there is a family of intelligent engines (including the rule engine) that can resolve the optimization problem generated automatically based on the applicable dynamic rules.

16 Claims, 1 Drawing Sheet

Rule-based Architecture with Rule Templates

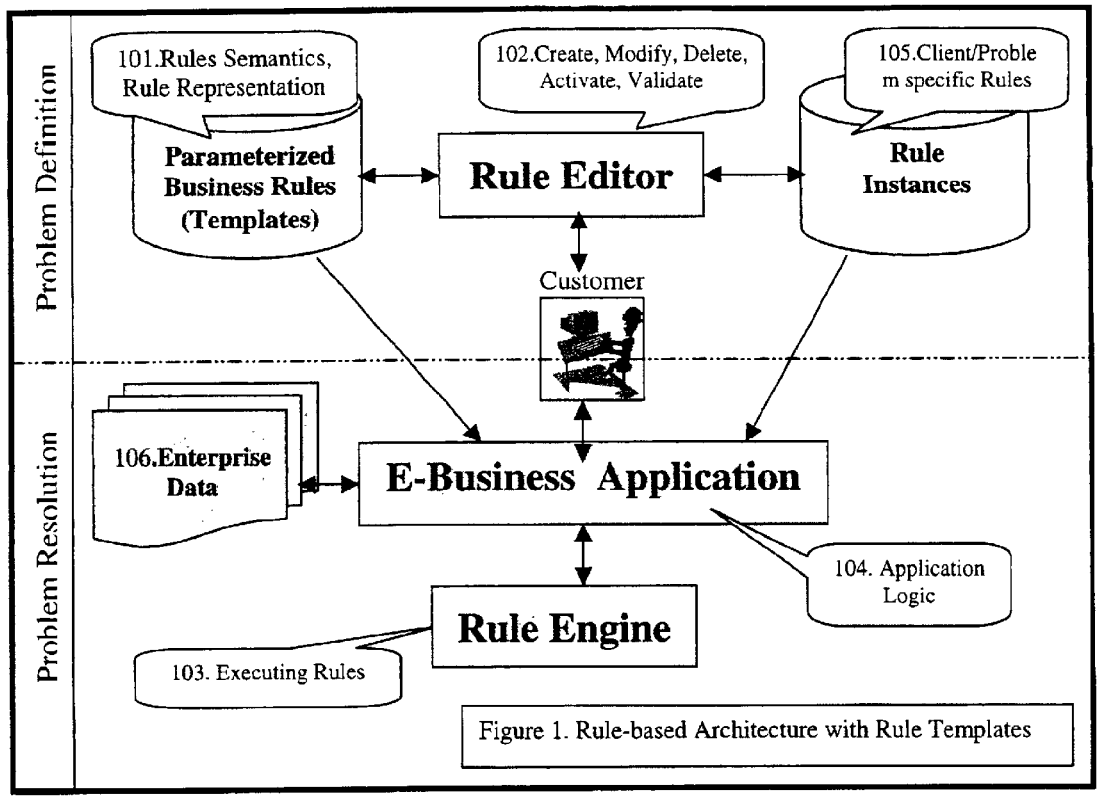
Figure 1. Rule-based Architecture with Rule Templates
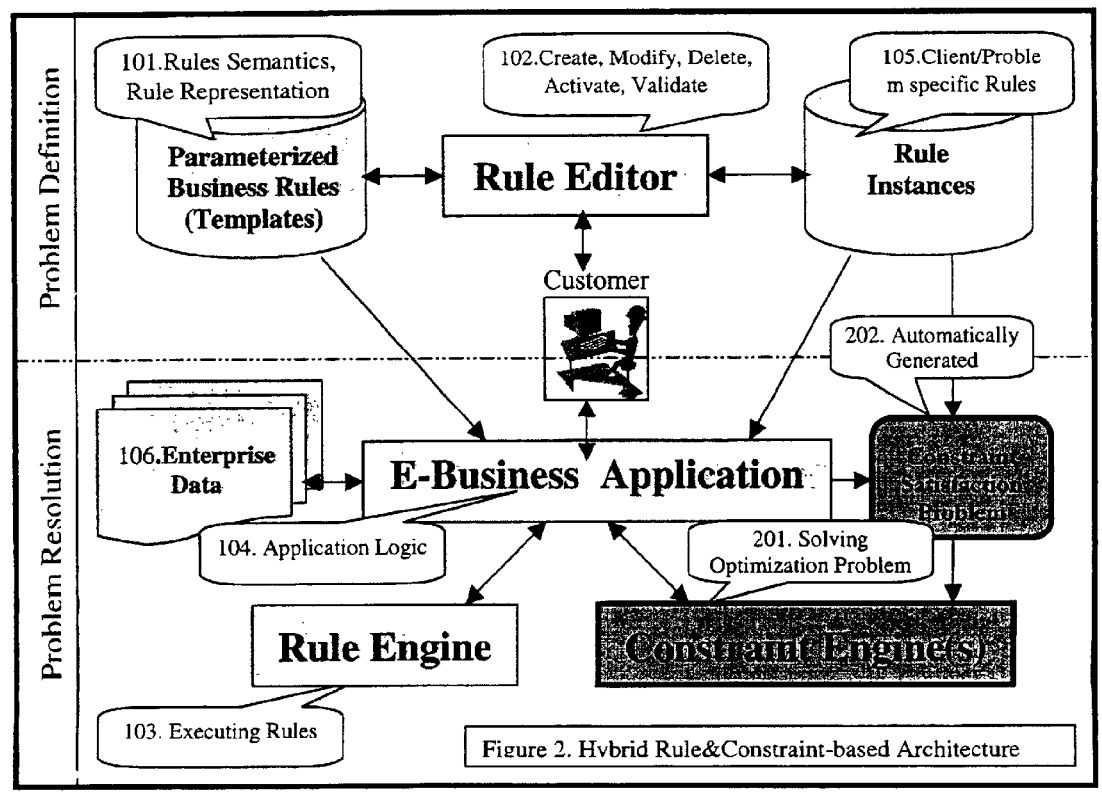
Figure 2. Hybrid Rule&Constraint-based Architecture

HYBRID USE OF RULE AND CONSTRAINT ENGINES

The present application claims priority to the provisional filed application entitled Hybrid Use of Rule and Constraint Engines, filed on Jun. 25, 2001, U.S. Ser. No. 60/300,951, which is also incorporated herein by reference. This application is related to the co-pending application entitled *Minimization of Business Rules Violation*, filed on Sep. 12, 2001, U.S. Ser. No. 09/953,697; and the co-pending application entitled *Consistency Validation for Complex Classification Rules*, filed on Sep. 11, 2001, U.S. Ser. No. 09/953,701.

FIELD OF THE INVENTION

The present invention relates generally to the field of expert systems.

BACKGROUND OF THE INVENTION

Rete engines, which are very efficient software tools to process rules, have been known to those skilled in the art since 1982. Currently three major competitors in this field are known to the inventor. Two are commercial providers of rule engines that are usually used for configuration applications. Another is an open source type of engine.

To make a Rete or rules engine useful, it must be somehow integrated into an application. For example, when designing an automobile for sale, a designer can select from a wide variety of options and combinations of options. If, for example, a car has a two-liter engine, it cannot have both power windows and air conditioning, because both systems being used together would exceed the electrical power available from a two-liter engine. However, both systems may be included in the design if the car has a three-liter engine. When an automobile is being designed, these and a multitude of other, similar rules must be observed to ensure that the features included in any one combination of options conform to all the limitations inherent in its design.

Another example of using rules is in banking, where customer transactions, for example, are governed by a variety of combinations of rules. For example, certain customers cannot do certain transactions unless certain documents are on file with the bank. Or, in another example, taxes may be withheld on distributions of income from investments if no exemptions from withholding are on record in the bank. In every case, each transaction must be checked against several or all of the rules to ensure that all the laws that have been converted into rules have been obeyed in performing these transactions.

Rule-Based Technology

Business rules are statements of business policies and procedures that drive day-to-day business activity. Rule-based technology provides the ideal architecture for implementing flexible, easy-to-maintain business rule applications because they keep the rules separate from the application code. This technology is based on the rule engines, well known as Rete engines, and used by most expert systems. Specialized rule languages and the rule engines supporting them are rapidly becoming a must-have element within e-commerce platforms and B2B/B2C applications.

Constraint-Based Technology

In the last 10 years, constraint-based-programming became a leading technique for solving complex optimization problems in manufacturing, finance, telecom, logistics, and other industries. Classical constraint satisfaction problems (CSPs) involve finding values for problem variables (unknowns) subject to constraints on which combinations of values are allowed. Constraint satisfaction has wide application in practical decision support systems and in artificial intelligence.

Both rule- and constraint-based technologies add declarative programming to application development paradigms.

While both technologies are effectively used in their specific areas, rules technology is especially suited to describe the business problem in business terms. At the same time, constraint technology is especially suited to find the optimal solution of the CSP, which is difficult for non-technical users to describe. When applied to real-world applications, business rules have to deal with the following problems:

Problem 1: Impossibility of Covering ALL Business Situations

In the environment where the most business situations could be presented in the form of rules with known actions for all described conditions, the rules engine efficiently executes the rules, producing the results described in the selected actions. In this case, "one generic rule engine fits all" problems. However, in the real-world applications, the tree of all business situations could be so large and complex that an attempt to describe all branches of such tree usually ends up with a huge non-maintainable set of rules. Adding the fact that most rules could be frequently modified, the maintenance of thousands of inter-related rules becomes a nightmare.

Problem 2: Inability of the Rule Engine to Recommend the Optimal Business Solution A generic rule engine can point to the rule violations or do some calculations described in the rule actions. However, its decision support abilities are limited to the logic incorporated into the rules themselves. While this could be acceptable for logical puzzles, for which rules are defined by technical specialists, it is not acceptable for business rules created and maintained by non-technical users. In such cases, a generic rule engine cannot recommend the optimal decision in the environment where a lot of business choices are not covered by the rules.

SUMMARY OF THE INVENTION

A method and apparatus that allow business users to dynamically add, modify, and delete business rules and associated constraints, and then to apply these changes in a very efficient manner without needing to recompile and/or restart e-business applications, is disclosed. According to one embodiment, hybrid use of the business rules and constraints with multiple decision-support engines provides the practical solution for the described problems. Rules are used to define the generic search space only, without needing to describe all special cases. Then an optimization (not rule-based) engine can automatically create and analyze all possible branches of the tree specified by the rules to select the best one. Because one universal rule engine is not sufficient to handle online decision support, in one embodiment there is a family of optimization engines (including the rule engine) that can resolve the optimization problem generated automatically based oil the applicable dynamic rules.

BRIEF DESCRIPTION OF THE DRAWINGS

FIG. 1 shows a typical rule-based system, according to one embodiment.

FIG. 2 shows a hybrid rules and constraints engine, according to one embodiment.

DETAILED DESCRIPTION

Rule-based and constraint-based technologies are used together to address complex decision support problems for modem e-business applications.

FIG. 1 shows a typical rule-based system according to one embodiment. Modem rule-based systems support the methodology that allows a customer to build rules templates 101, which cover the specific business application, and then to create and maintain different rule instances based on these rule templates.

In one embodiment, the rule templates are usually represented using a specialized rule language, which allows a user to specify the semantics of the rule, the types of parameters and different user representations. A user can create and modify rule templates and rule instances using a graphical Rule Editor 102. The e-business application 104 creates a rule-based engine 103 and adds to it the proper rule instances 105 and application-specific objects, such as data from enterprise data set 106. Then it runs the Rule Engine 103, which executes the rules.

An hybrid rules and constraints architecture, according to one embodiment, is presented in FIG. 2. FIG. 2 shows, in addition to the elements of FIG. 1, constraints 202 and constraint engine 201. The constraints 202 are created by the business application 104 based on the rule templates 101 and rule instances 105, in conjunction with constraint engine 201. The business application 104 then can interact with constraint engine 201, enabling it to provide efficient decision support by solving the automatically generated optimization problem.

In contrast to the architecture of FIG. 1, the improved architecture of FIG. 2, in one embodiment, adds two major features: automatic generation of the constraint satisfaction problem(s) (CSPs) based on the applicable business rules; and constraint-based optimization engines, which solve the proper CSP(s). Methodologically, in one embodiment, the architecture includes the following novel design solutions: use of the constraint-based optimization engines to solve the problem specified in terms of the rules; extension of the rule programming language with the constraint programming constructs and mixed use of them inside the template representation (for example, the XML/Java template representation); and the ability to add online decision support to the rules processing systems. This approach allows the use of the constrained expressions directly in the rule templates. As a result, in one embodiment, when the end user makes some changes in the rule instances, the proper constraint satisfaction problems would be generated and solved automatically without any manual changes.

To support the proposed methodology, in one embodiment software is implemented using the generic XML/Java-based rule language, which is in one embodiment used as the source for the problem definition. From this language, in one embodiment, a code generator (not shown) is used to generate two outputs: rules presented in a rule language; and constraint satisfaction problems expressed in the terms of a development environment (such as Java Constrainer™) for the Constraint Engine 201. In one embodiment, a web-based Rule Editor 102 is used to create, modify, delete, and validate different rule sets.

This unique approach allows users to create and execute thousands of customized dynamic rules and associate them with constraints without serious performance and maintenance penalties. This is advantageous when it becomes desirable to incorporate business rules into high-performance e-business applications with decision support capabilities.

The processes and embodiments as described above can be stored on a machine-readable medium as instructions. The machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.). The device or machine-readable medium may include a solid state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:

generating business rules using a rules editor;

defining a constraint satisfaction problem in terms of the business rules;

executing the business rules using a rules engine; and resolving the constraint satisfaction problem in terms of constraints using a constraint based optimization engine.

2. The method of claim 1, wherein the constraint satisfaction problem is specified by the business rules and is automatically generated and resolved.

3. The method of claim 1, wherein a rule language used to represent the business rules is extended with constraint programming constructs.

4. The method of claim 3, wherein the rule language is mixed with the constraint programming constructs inside a rule template representation.

5. The method of claim 4, wherein the rule template representation is an XML/Java template representation.

6. The method of claim 1, wherein online decision support with optimization facilities is added to a system that formerly processed the business rules only.

7. The method of claim 1, further comprising providing for generation of two outputs, wherein a first output comprises rules presented in a rule language and a second output comprises a constraint satisfaction problem expressed in terms of a constraint programming language.

8. A machine-readable medium that provides instructions which, when executed by a machine, cause the machine to perform operations comprising:

generating business rules using a rules editor;

providing for automatic generation of a constraint satisfaction problem based on the business rules;

executing the business rules using a rules engine; and providing for solution of the constraint satisfaction problem in terms of constraints using a constraint based optimization engine.

9. The machine-readable medium of claim 8, wherein a rule language used to represent the business rules is extended with programming constructs associated with the constraint satisfaction problem.

10. The machine-readable medium of claim 9, wherein the rule language is mixed with the programming constructs inside a rule template representation.

11. The machine-readable medium of claim 10, wherein the rule template representation is an XML/Java representation with both rules and constraints.

12. The machine-readable medium of claim 8, wherein online decision support with optimization capabilities is added to a rules proccessing system.

13. The machine-readable medium of claim 8, wherein operations further comprise providing for generation of two outputs, wherein a first output comprises rules presented in a rule language and a second output comprises constraint satisfaction problems expressed in terms of a development environment for a constraint engine.

14. An apparatus comprising:
a rules editor to generate business rules;
a business application to provide for automatic generation of a constraint satisfaction problem based on the business rules;
a rules engine to execute the business rules; and
a constraint engine coupled with the business application to provide for solution of the constraint satisfaction problem.

15. The apparatus of claim 14, wherein online decision support with optimization facilities is added to a system that processed the business rules only.

16. The apparatus of claim 14, further comprising a code generator coupled with the business application and the constraint engine to provide for generation of two outputs, wherein a first output comprises rules presented in a rule language and a second output comprises constraint satisfaction problems expressed in terms of a development environment for a constraint engine.

* * * * *